(12) United States Patent
Oguchi (10) Patent No.: US 6,527,590 B2
(45) Date of Patent: Mar. 4, 2003

(54) CARD CONNECTOR HAVING OVERSTROKE FOR CARD MOUNTING POSITION

(75) Inventor: Wataru Oguchi, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/949,418

(22) Filed: Sep. 7, 2001

(65) Prior Publication Data

US 2002/0037667 A1 Mar. 28, 2002

(30) Foreign Application Priority Data

Sep. 28, 2000 (JP) ........................................ 2000-300581

(51) Int. Cl.$^7$ .............................................. H01R 24/00
(52) U.S. Cl. ..................................... 439/630; 439/924.1
(58) Field of Search .............................. 439/630, 924.1, 439/636, 637, 862

(56) References Cited

U.S. PATENT DOCUMENTS

| | | | | |
|---|---|---|---|---|
| 3,470,522 A | * | 9/1969 | Lawrence | .................... 439/862 |
| 3,631,381 A | * | 12/1971 | Pittman | ....................... 439/637 |
| 5,040,991 A | * | 8/1991 | Collier | ......................... 439/630 |
| 5,080,613 A | | 1/1992 | Orui et al. | .................... 439/660 |
| 5,463,210 A | * | 10/1995 | Imura | ....................... 439/924.1 |
| 5,775,929 A | | 7/1998 | Hashiguchi | ................. 439/260 |
| 5,969,329 A | | 10/1999 | Vallat | .......................... 235/475 |

FOREIGN PATENT DOCUMENTS

EP        0595305 A1        5/1994

* cited by examiner

*Primary Examiner*—Javaid Nasri
(74) *Attorney, Agent, or Firm*—Beyer Weaver & Thomas (57) ABSTRACT

The present invention provides a card connector capable of preventing contact parts of connector terminals from coming off card contact terminal parts due to overstroke after the contact parts contact the card contact terminal parts when the card is mounted. A housing 1 is disposed with a first contact part and a second contact part which are different from each other in placement position in an insertion direction of a card, correspondingly to one contact terminal part disposed in the card, and when the card is inserted or ejected, as long as the card is further subjected to overstroke in the insertion direction from a card mounting position, at least one of the first contact part and the second contact part is formed so as to always contact one contact terminal part.

3 Claims, 5 Drawing Sheets

CARD CONNECTOR HAVING OVERSTROKE FOR CARD MOUNTING POSITION

BACKGROUND OF THE INVENTION

1. Field of the Invention

The present invention relates to the structure of a card connector used with an IC card used as a storage medium of a personal computer or the like, and used with a compact flash (CF) card used in electronic equipment such as digital cameras.

2. Description of the Prior Art

An IC card connector is generally used as an additional recording apparatus of personal computers and the like. The IC card is widely used as a storage medium of the IC card connector.

The IC card is mounted in the IC card connector to perform writing and reading of necessary information. Well-known IC card connectors have a locking mechanism that locks an IC card in a mounting position when it is inserted, and performs unlocking to eject it from the mounting position when it is ejected.

The locking mechanism comprises a heart-shaped lock cam provided in a frame having an IC card housing recess, and a lock pin engaged in the lock cam at one end thereof and rotatably supported by a sliding member at another end thereof, wherein the sliding member is moved in an insertion direction as an IC card is inserted, whereby one end part of the lock pin slides in the lock cam to perform locking and unlocking.

In the locking mechanism, as the IC card is moved in an insertion direction, the lock pin slides within the lock cam and the IC card is temporarily subjected to overstroke, then locked in a mounting position. To unlock the IC card, the IC card locked in the mounting position is temporarily pressed (overstroke) in the insertion direction, whereby the lock pin is disengaged from a lock part of the lock cam and the IC card is ejected in an ejection direction by the energizing force of a coil spring energizing the sliding member in the ejection direction.

In the structure of the above-described conventional IC card connector, to eject the IC card from the mounting position, it must be temporarily pressed (i.e., "overstroke") along the insertion direction. Thereby, when the IC card is inserted or ejected, it is temporarily moved in the card insertion direction (toward the depth) from the mounting position by the overstroke, then again returns to the mounting position, and inevitably, the contact parts of connector terminals provided in a housing temporarily slide to rear ends of contact terminal parts of the IC card and again are slid to the tips thereof. Hence, if contact positions of contact parts of the connector terminals with the contact terminal parts when the IC card is in the mounting position are set on the rear end side of the contact terminal parts, when the IC card temporarily moves in the card insertion direction (toward the depth), since the contact parts of the connector terminals will lose contact with the contact terminal parts, usually, contact positions of contact parts with the contact terminal parts when the IC card is in the mounting position are preferably set on the tip side of the contact terminal parts so that the contact between the contact terminal parts and the contact parts does not become unstable.

However, for example, in the case where two types of IC cards different in the layout of contact terminal parts are used by one connector, and the case where sequence operation (time difference is provided for contacting timing) is required because of a relation with other contact terminal parts within an IC card), contact positions of contact parts of the connector terminals with the contact terminal parts when the IC card is in the mounting position must be set on the rear end side of the contact terminal parts, posing the problem that contact positions of contact parts of the connector terminals with the contact terminal parts when the IC card is in the mounting position cannot be set on the tip side of the contact terminal parts.

SUMMARY OF THE INVENTION

Therefore, the present invention has been made to solve the above-described problems and provides a card connector capable of preventing contact parts of connector terminals from coming off card contact terminal parts due to overstroke after the contact parts contact the card contact terminal parts when the card is mounted.

To solve the above-described problems, as first means of the present invention, there is provided a card connector that comprises a housing in which a card at one end of which plural contact terminal parts are juxtaposed is mounted, and plural connector terminals, placed at one end of a card housing recess of the housing, having contact parts connected with the contact terminal parts as the card is inserted, wherein the housing is disposed with a first contact part and a second contact part which are different from each other in placement position in a card insertion direction, corresponding to at least one of the contact terminal parts, and wherein when the card is inserted or ejected, as long as the card is further subjected to overstroke in the insertion direction from a card mounting position, at least one of the first contact part and the second contact part is formed so as to always contact the one contact terminal part.

As second means, there is provided the card connector, wherein the first contact part and the second contact part are formed by dividing a tip of one of the plural connector terminals.

As third means, there is provided the card connector, wherein the first contact part is formed longer in the card insertion direction than the second contact part and placed on the card insertion port side, and wherein when the distance between the first contact part and the second contact part is A, the distance from a contact position of the first contact part with the contact terminal part to the card insertion port side edge of the contact terminal part is B when the card is in a mounting position, the length of the contact terminal part in a card insertion direction is L, and an overstroke amount of the card is S, a relation of L>A>S−B is satisfied among them.

As fourth means, there is provided the card connector, wherein the first contact part and the second contact part are formed by dividing a tip of one of the plural connector terminals to two branches.

As fifth means, there is provided the card connector, wherein the connector terminals having the first and second contact parts are ground or power connector terminals.

BRIEF DESCRIPTION OF THE DRAWINGS

Preferred embodiments of the present invention will be described in detail based on the followings, wherein.

DESCRIPTION OF THE PREFERRED EMBODIMENTS

Figure 1:
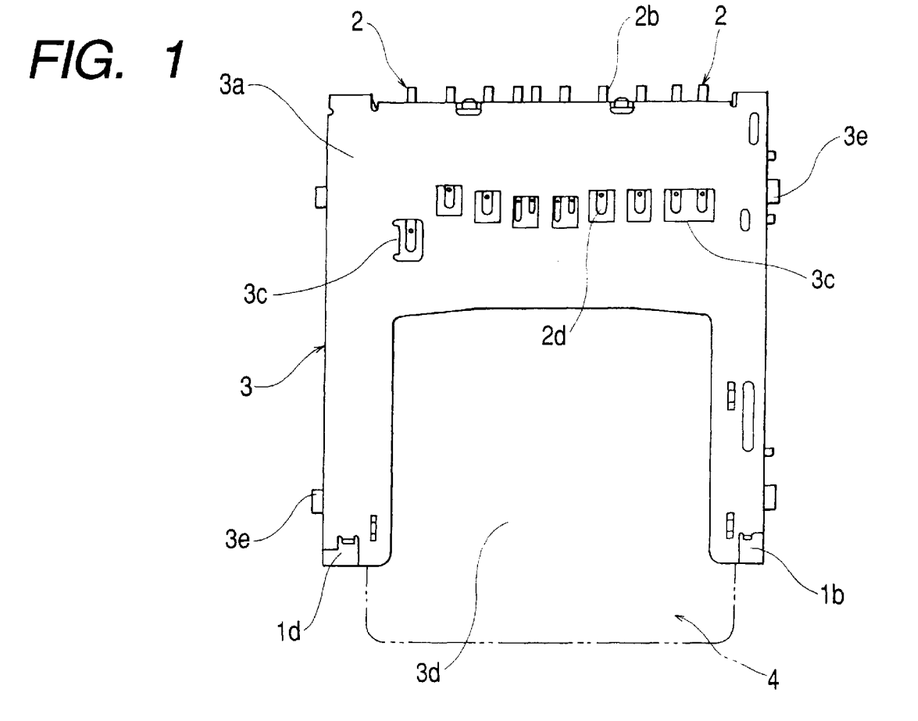
FIG. 1 is a plan view of a card connector according to a first embodiment of the present invention.
Figure 2:
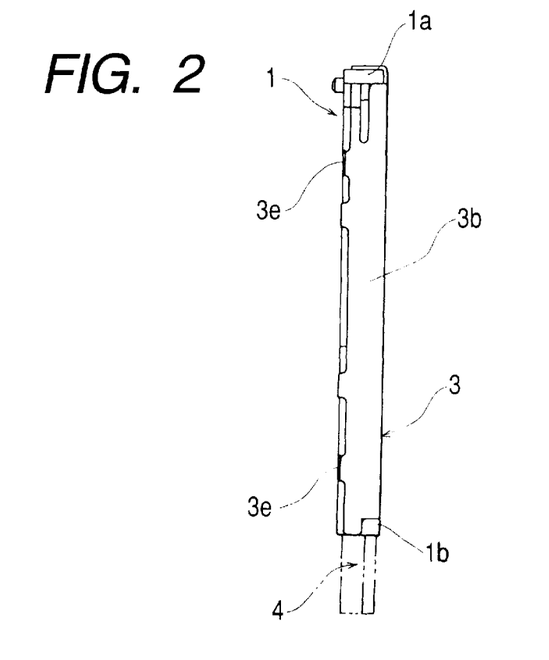
FIG. 2 is a side view of the same card connector.
Figure 3:
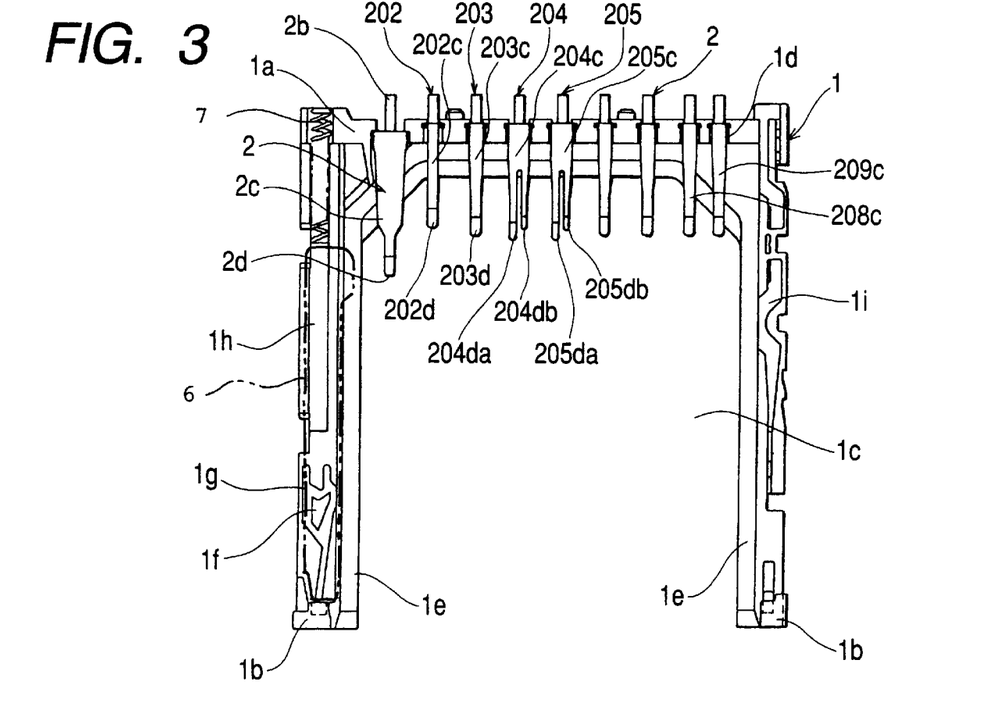
FIG. 3 is a plan view of a housing of the card connector.
Figure 4:
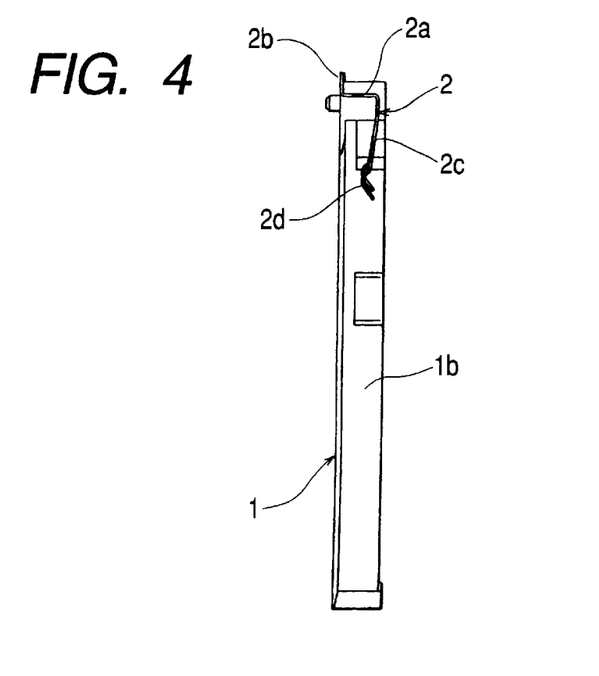
FIG. 4 is a side view of the same housing.
Figures 5, 6A:
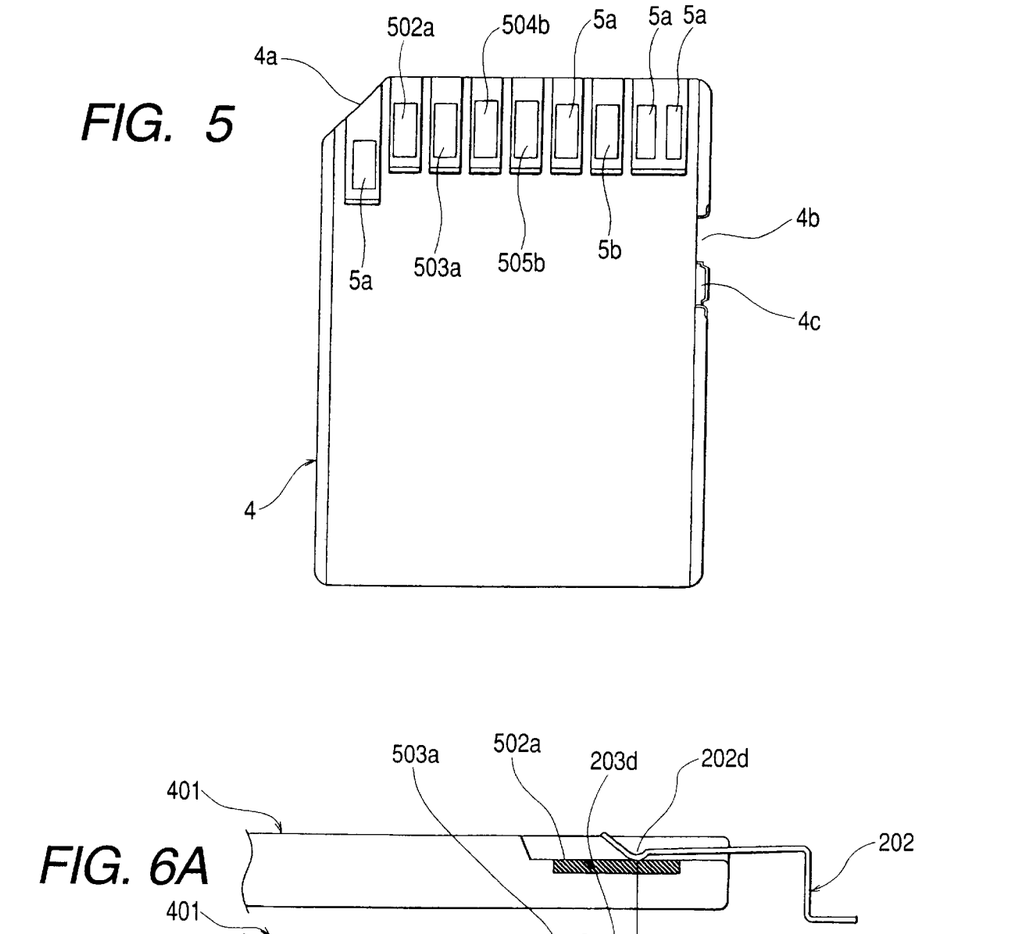
FIG. 5 is a plan view of an IC card of the present invention.
FIGS. 6A, 6B and 6C illustrate the states of contact between contact terminal parts and contact parts of connector terminals when an IC card is mounted.
Figures 6B, 6C:
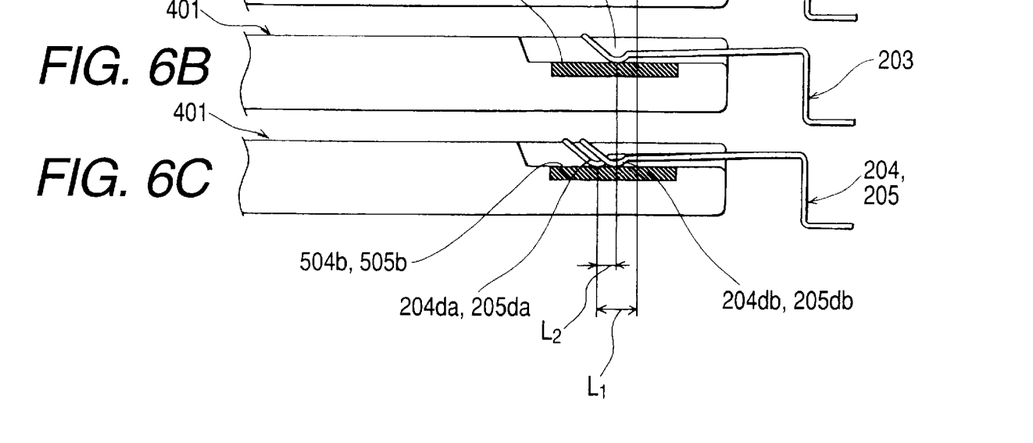
Figure 7:
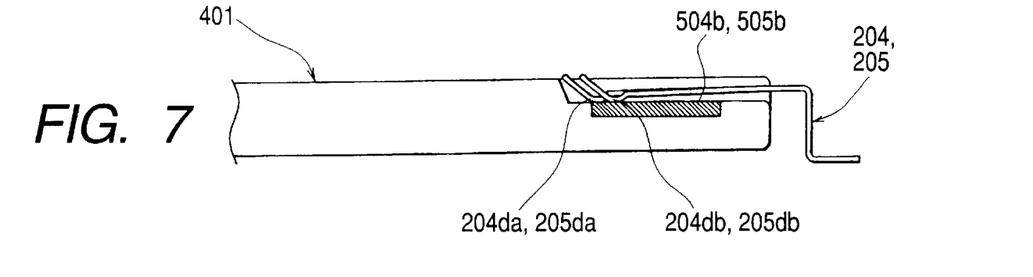
FIG. 7 illustrates the state of contact between contact terminal parts and contact parts at the time of overstroke.
Figure 8A:
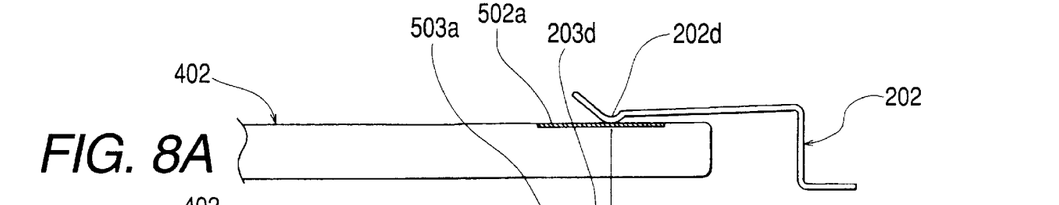
FIGS. 8A, 8B and 8C illustrate the states of contact between contact terminal parts and contact parts of connector terminals when another IC card is mounted.
Figures 8B, 8C:
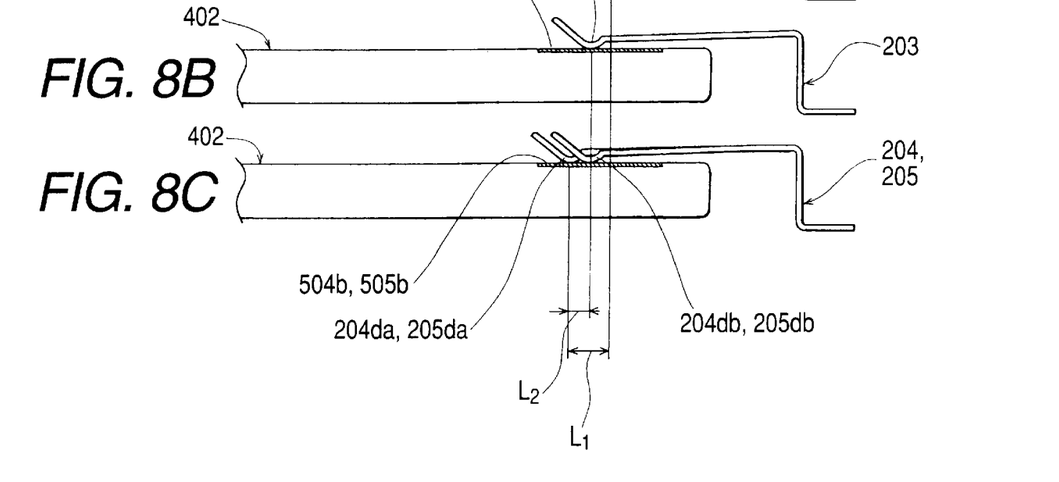
Figure 9:
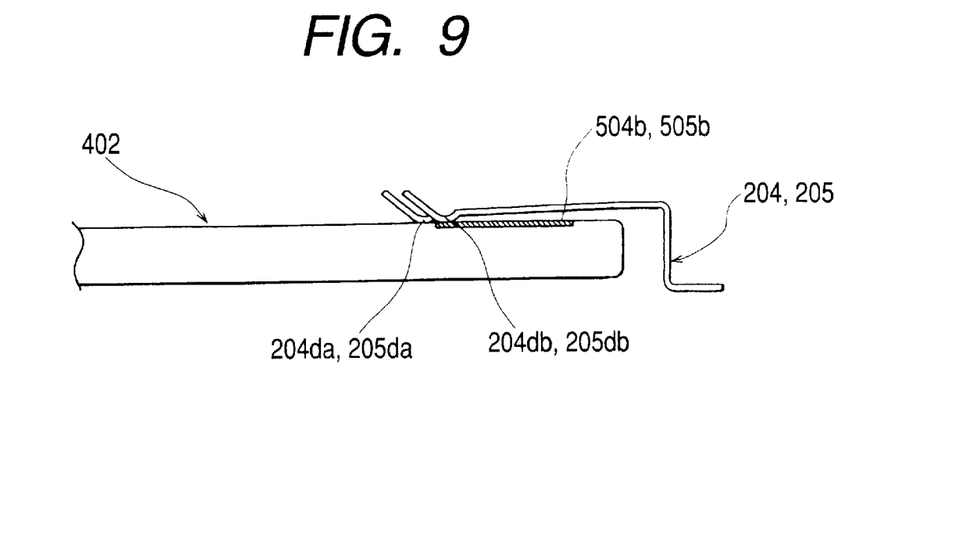
FIG. 9 illustrates the state of contact between contact terminal parts and contact parts at the time of overstroke.
Figure 10:
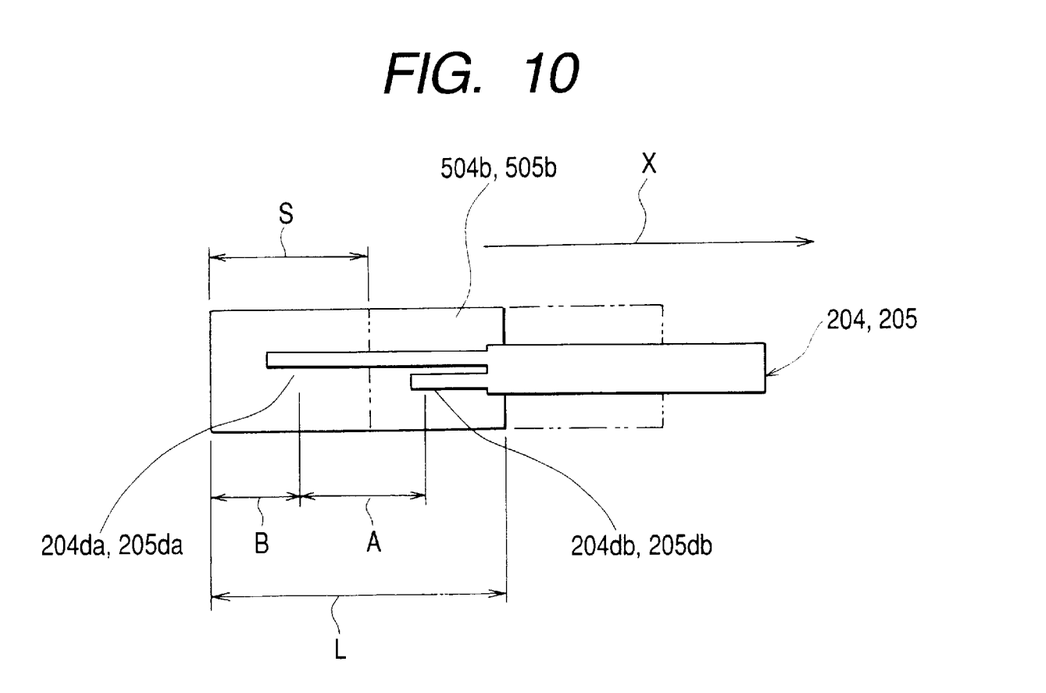
FIG. 10 is a simple relationship diagram showing the state of contact between a contact terminal part, and first and second contact parts of connector terminals when an IC card is mounted, and at the time of overstroke.

Hereinafter, one embodiment of the present invention is shown in FIGS. 1 to 10. FIG. 1 is a plan view of a card connector. FIG. 2 is a side view of the same. FIG. 3 is a plan view of a housing. FIG. 4 is a side view of the same. FIG. 5 is a plan view of an IC card. FIG. 6 illustrates the states of contact between contact terminal parts and contact parts of connector terminals when an IC card is mounted. FIG. 7 illustrates the state of contact between contact terminal parts and contact parts at the time of overstroke. FIG. 8 illustrates the states of contact between contact terminal parts and contact parts of connector terminals when another IC card is mounted. FIG. 9 illustrates the state of contact between contact terminal parts and contact parts at the time of overstroke. and FIG. 10 is a simple relationship diagram showing the state of contact between contact terminal parts, and first and second contact parts of connector terminals when an IC card is mounted, and at the time of overstroke.

In the drawings, a housing 1 is made of an insulating material such as synthetic resin and formed into a substantial U character shape. At the center of the housing 1, a header part 1a in which plural connector terminals 2 made of a conductive metallic material are juxtaposed is provided, and at both ends of the header part 1a, guide frames 1b for guiding insertion of an IC card 4 described later are formed in opposed relation to each other. A portion surrounded by the header part 1a and the guide frames 1b forms a housing part 1c of the IC card 4 described later, and the connector terminals 2 juxtaposed in the header part 1a are formed to project into the housing part 1c.

The plural connector terminals 2 each are formed of a flat base 2a, and a connection strip 2b and a contact strip 2c which are formed bent to a substantial Z shape in a direction facing each other from the base 2a. The connector terminals 2 are secured with the bases 2a engaged in the engagement slots 1d provided in the header part 1a of the housing 1, and the connection strips 2b formed at one end of the bases 2a are disposed to project outward from the bottom of an outside face of the header part 1a. The connection strips 2b are soldered with circuit patterns on external circuit boards of electronic equipment to transmit signals. The contact strips 2c formed at another end of the bases 2a are disposed to project into the housing part 1c of the IC card 4 from an upper face of an inner side of the header part 1a. At the tip of the contact strips 2c, a contact part 2d connected to contact terminal parts 5 of the IC card 4 described later is formed.

The plural contact strips 2c are juxtaposed at intervals corresponding to the intervals of contact terminal parts 5 of the IC card 4 described later; in this case, as shown in FIG. 3, two contact strips 208c and 209c are formed at a somewhat short interval. The fourth and fifth contact strips 204c and 205c from the left are divided into two branches at the tips thereof at which first contact part 204da or 205da, and second contact part 204db or 205db are respectively formed. The first contact part 204da or 205da, and the second contact part 204db or 205db are formed so as to be placed differently from each other in an IC card insertion direction; as shown in FIG. 3, the first contact part 204da and 205da are formed forwarder (toward an insertion port) in an IC card insertion direction than the second contact parts 204db and 205db. The contact strips 204c and 205c are disposed so that the fork-tailed first contact part 204da or 205da and second contact part 204db or 205db correspond to one contact terminal part 5 of the IC card 4.

The first contact part 204da or 205da, and the second contact part 204db or 205db are provided in the connector terminals 204 and 205, respectively. Herein, the connector terminals 204 and 205 serve as ground or power connector terminals. The contact strips 204c and 205c of the ground or power connector terminals 204 and 205 are different in length from contact strips 202c and 203c of other connector terminals 202 and 203 for signal lines, and the contact strips 204c and 205c of the ground or power connector terminals 204 and 205 are formed longer in an IC card 4 insertion direction than the contact strips 202c and 203c of the connector terminals 202 and 203 for signal lines.

The first contact parts 204da and 205da of the ground or power connector terminals 204 and 205 protrude from the contact parts 202d and 203d of the connector terminals 202 and 203 for signal lines along an IC card 4 insertion direction. As a result, when the IC card 4 is mounted, the contact terminal parts 5 of the IC card 4 are connected first with the first contact parts 204da and 205da of the ground or power connector terminals 204 and 205, and then with the contact parts 202d and 203d of the connector terminals 202 and 203 for signal lines.

According to the above configuration, corresponding to one contact terminal part 5 of the IC card 4, the first contact parts 204da and 205da protrude from the second contact parts 204db and 205db of the ground or power connector terminals 204 and 205 along an IC card insertion direction. With this structure, when an IC card is in a mounting position, even in the case where one (herein, the first contact part) of the contact parts is set to make contact on the rear end side of the contact terminal part 5, since at least the other (herein, the second contact part) contacts the contact terminal part 5 during overstroke, the ground or power connector terminals 204 and 205 will not lose contact with the contact terminal part 5.

Since the first contact part 204da or 205da, and the second contact part 204db or 205db are formed by dividing the respective tips of the connector terminals 204 and 205 to two branches, contact pressure on the contact parts can be equated, stabilizing contact.

The connector terminals 204 and 205 are ground or power connector terminals, which must contact earliest the contact terminal part 5 during sequence operation. Therefore, by forming the tips of the connector terminals 204 and 205 so as to fork into two branches, when the IC card is in a mounting position, the first contact parts 204*da* and 205*da* can be effectively placed on the rear end side of the contact terminal part 5.

When the IC card 4 is in a mounting position, since the first contact parts 204*da* and 205*da* can be placed on the rear end side of the contact terminal part 5, they can be adequately distant from the contact parts 202*d* and 203*d* of other connector terminals 202 and 203 for signal lines to be subjected to sequence operation.

When the IC card 4 is mounted, even if it rattles due to vibration and moves a little in an ejection direction, the other connector terminals 202 and 203 for signal lines will not lose contact with the contact terminal part 5.

The guide frames 1*b* each are provided with a guide groove 1*e* for guiding a side face of an IC card 4 described later to the housing part 1*c* when it is inserted. One of the guide frames 1*b* is provided with a heart-shaped lock cam 1*g* having a locking part 1*f* for locking a sliding member (not shown) for guiding the IC card 4 in a housing position of IC card 4, and a spring housing part 1*h* for housing a coil spring (not shown), which is an energizing member for energizing the sliding member in an ejection direction. Another guide frame 1*b* is provided with a switch housing part 1*i* for housing a write protect switch (not shown), which is, for example, a detection switch for inhibiting writing.

A cover member 3 is made of a conductive metallic material and formed into a substantial U shape, and is formed of a flat upper plate 3*a* and opposing side plates 3*b*. The upper plate 3*a* is provided with plural window holes 3*c* corresponding to the contact strips 2*c*, and has an opening 3*d* provided in an IC card 4 insertion side. The side plates 3*b* are provided with a ground terminal 3*e*, which is connected to a ground pattern of a circuit board of electronic equipment not shown to shield the IC card 4 and card connectors. The cover member 3 is engaged in the housing 1 so as to cover the header part 1*a* and the connector terminals 2 of the housing 1.

The IC card 4 internally houses an integrated circuit (IC) and is widely used as a recording medium. On one surface of the IC card 4, plural contact terminal parts 5 are formed at one end thereof, and the contact terminal parts 5 are housed in the housing part 1*c* of the housing 1 to contact the plural contact strips 2*c* disposed in the header part 1*a*, whereby various types of information processing are performed with electronic equipment externally connected.

The plural contact terminal parts 5 include contact terminal parts 5*a* for signal lines used to transmit data, and contact terminal parts 5*b* for ground and power use. In such a case, usually, one of the contact terminal parts 5*a* for signal lines is shared with a contact terminal for detecting a card. For example, in the IC card 4 shown in FIG. 5, the second contact terminal part 5 from the left is a contact terminal part 502*a* for signal line which is shared with a contact terminal for detecting a card, and the fourth and fifth contact terminal parts 5 from the left are contact terminal parts 504*b* and 505*b* for ground or power use.

The IC card 4 is provided with a diagonal notch 4*a* at a corner of the area in which the contact terminal parts 5 are formed. By engaging a sliding member (not shown) in the notch 4*a*, the sliding member can move in an insertion direction as the IC card 4 is inserted.

At one side face of the IC card 4, a concave groove 4*b*, which is an identification part indicating inhibition of writing to the IC card, is formed and provided with a slidable projection 4*c*. By sliding the projection 4*c*, the concave groove 4*b* can be changed in position so that whether to inhibit or permit writing to the IC card can be changed according to the position.

Next, a description will be made of the mounting of the IC card 4 in the housing 1.

To house the IC card 4 in the housing 1, the IC card 4 is inserted from the opening side of the housing part 1*c* of the housing 1. At this time, the notch 4*a* of the IC card 4 is engaged with a sliding member (not shown), the sliding member is moved in an insertion direction along with the IC card 4, and a lock pin (not shown) slides within the lock cam 1*g* and is locked in the locking part 1*f* after overstroke. In this state, the IC card 4 is mounted in the housing position.

At this time, as shown in FIGS. 6 and 8, the contact terminal parts 5 provided at the tip of the IC card 4 are connected with the contact strips 2*c* of the connector terminals 2 juxtaposed in the header part 1*a*. In this case, since the ground or power contact terminal parts 504*b* and 505*b* (the fourth and fifth from the left in FIG. 5) of the contact terminal parts 5 correspond to the ground or power connector terminals 204 and 205 (the fourth and fifth from the left in FIG. 5), the first contact part 204*da* or 205*da* and the second contact part 204*db* or 205*db* of the ground or power connector terminals 204 and 205 are connected to the ground or power contact terminal parts 504*b* and 505*b*.

FIGS. 6 and 8 show the states in which IC cards 401 and 402 of different types are used, wherein the IC cards 401 and 402 are some what different in the position in which the contact terminal parts 5 are placed. In this case, in an IC card mounting position, stable contact is maintained between the contact terminal parts 5 and the contact parts 2*d* of the connector terminals 2. FIGS. 7 and 9 shows overstroke of the IC cards. In the case of the IC card 401 (FIG. 7), both the first contact parts 204*da* and 205*da*, and the second contact parts 204*db* and 205*db* of the ground or power connector terminals 204 and 205 contact the contact terminal parts 5. By contrast, in the case of the IC card 402 (FIG. 9), although the second contact parts 204*db* and 205*db* contact the contact terminal parts 5, the first contact parts 204*da* and 205*da* lose contact with rear ends of the contact terminal parts 5 and are electrically disconnected with the contact terminal parts 5.

As described above, when different types of IC cards are used, even if the first contact parts 204*da* and 205*da* lose contact with the contact terminal parts 5 during overstroke, stable contact is maintained since the second contact parts 204*db* and 205*db* are in contact with the contact terminal parts.

In this case, as shown in FIGS. 6 and 8, since the first contact parts 204*da* and 205*da* (FIGS. 6C and 8C) of the ground or power connector terminals 204 and 205, and the contact parts 202*d* (FIGS. 6 and 8) and 203*d* (FIGS. 6B and 8B) of the connector terminals 202 and 203 for signal lines must be subjected to sequence operation, they are formed so as to be placed in different positions in an insertion direction (indicated by L1 and L2 in FIGS. 6 and 8) in an IC card mounting position. Since the ground or power connector terminals 204 and 205 must contact earliest the contact terminal part 5 during sequence operation, the first contact parts 204*da* and 205*da* are placed on the rear end side of the contact terminal parts 5.

FIG. 10 is a relationship diagram showing the state of contact between the contact terminal part 5, and the first contact part 204*da* or 205*da* and the second contact part 204*db* or 205*db* of the ground or power connector terminals 204 and 205, wherein the first contact parts 204*da* and 205*da* are formed longer in a card insertion direction (arrow X)

than the second contact parts 204db and 205db, and are placed on the side of a port through which the IC card 4 is inserted.

When the distance between the first contact part 204da or 205da, and the second contact part 204db or 205db is A, the distance from a contact position of the first contact part 204da or 205da with the contact terminal part 5 to the IC card 4 insertion port side edge of the contact terminal part 5 is B when the IC card 4 is in a mounting position, the length of the contact terminal part 5 in an IC card 4 insertion direction is L, and an overstroke amount of the IC card 4 is S, a relation of L>A>S−B is satisfied among them, where L is a default value (card specifications).

According to the above relational expression, since the distance A between the first contact part 204da or 205da, and the second contact part 204db or 205db is always greater than a value of (S−B) and always smaller than a value of L, the second contact part 204db or 205db keeps contact with the contact terminal part 5 without fail, so that stable electrical connection is maintained.

As described above, corresponding to one contact terminal part 5 of the IC card 4, the first contact part 204da or 205da and the second contact part 204db or 205db of the ground or power connector terminals 204 and 205 are disposed, and the first and second contact parts are placed differently from each other in an IC card insertion direction. With this structure, when the IC card is in a mounting position, even in the case where the first contact part 204da or 205da is set to make contact on the rear end side of the contact terminal part 5, since the second contact part 204db or 205db contacts the contact terminal part 5 during overstroke, the ground or power connector terminals 204 and 205 will not lose contact with the contact terminal part 5, and thus, stable electrical connection is maintained.

The contact strips 204c and 205c of the ground or power connector terminals 204 and 205 are formed longer in an IC card 4 insertion direction than the contact strips 202c and 203c of the connector terminals 202 and 203 for signal lines, and the first contact parts 204da and 205da of the ground or power connector terminals 204 and 205, and the contact parts 202d and 203d of the connector terminals 202 and 203 for signal lines are formed so as to be placed differently from each other in an IC card 4 insertion direction. Therefore, as the IC card 4 is inserted, the ground or power contact terminals 504b and 505b first contact the first contact parts 204da and 205da of the ground or power connector terminals 204 and 205. As the IC card 4 is further inserted, they contact the contact parts 202d and 203d of the connector terminals 202 and 203 for signal lines.

As described above, the first contact parts 204da and 205da of the ground or power connector terminals 204 and 205, and the contact parts 202d and 203d of the connector terminals 202 and 203 for signal lines become connected with a time difference. Consequently, sequence operation at the mounting of an IC card can be ensured.

Next, to eject the IC card 4 from a housing position of the housing part 1c, a lock pin (not shown) is disengaged from the locking part 1f by temporarily pressing (overstroke) the IC card 4 in the insertion direction. The pressing in the insertion direction causes the sliding member to be moved in the IC card insertion direction along with the movement of the IC card 4, at which time, with the lock pin disengaged from the locking part 1f, the IC card 4 is ejected to an initial position by the energizing force of a coil spring (not shown).

Although, in the above-described embodiment, the first contact part 204da or 205da, and the second contact part 204db or 205db of the ground or power connector terminals 204 and 205 are formed by dividing one connector terminal to two branches at a tip thereof, the present invention is not limited to this embodiment. For example, without dividing the tip to two branches, a slit part of a U-shape may be provided in the middle of a connector terminal to use one of two parts divided by the slit part as a second contact part 204db or 205db.

This simplifies the structure of a card connector and increases workability.

Instead of one connector terminal, two separate connector terminals may be provided for each set of the contact parts 204da and 204db, and the contact parts 205da and 205db. At this time, the first contact part and the second contact part (e.g., 204da and 204db) may be electrically connected through an external circuit board.

In such a case, the first contact part 204da or 205da and the second contact part 204db or 205db are provided for each contact terminal part 5. Therefore, one of the contact parts contacts the contact terminal part regardless of vibration, thereby increasing the reliability of contact.

As described above, in the card connector of the present invention, the housing is provided with a first contact part and a second contact part which are located at different positions along the card insertion direction, corresponding to one of contact terminal parts disposed in a card. When the card is inserted or ejected, as long as the card is further subjected to overstroke in the insertion direction from a card mounting position, at least one of the first contact part and the second contact part is formed so as to always contact one contact terminal part. With this structure, when the card is mounted, contact parts of connector terminals never lose contact with contact terminal parts of the card due to the overstroke, and thus, stable electrical connection is maintained.

Since the first contact part and the second contact part are formed by dividing the tip of one of plural connector terminals, the assembly of the card connector is simplified and workability is increased.

The first contact part is formed longer in the card insertion direction than the second contact part and placed on the card insertion port side, and when the distance between the first contact part and the second contact part is A, the distance from a contact position of the first contact part with the contact terminal part to the card insertion port side edge of the contact terminal part is B when the card is in a mounting position, the length of the contact terminal part in a card insertion direction is L, and an overstroke amount of the card is S, a relation of L>A>S−B is satisfied among them. By this arrangement, the second contact part contacts the contact terminal part without fail, thereby maintaining stable electrical connection.

Since the first contact part and the second contact part are formed by dividing the tip of one of the plural connector terminals to two branches, contact pressure on the contact parts can be equated, contributing to the stability of contact.

The connector terminals having the first and second contact parts are ground or power connector terminals, which must contact earliest the contact terminal parts during sequence operation. Therefore, when the card is in a mounting position, the first contact part can be effectively placed on the rear end side of the contact terminal part.

What is claimed is:

1. A card connector, comprising:
   a housing having a card insertion port for receiving a card at one end of which plural contact terminal parts are juxtaposed;

plural connector terminals placed at one end of the housing, each connector terminal being connected with each of the contact terminal parts of the card;

a sliding member movable in a card insertion direction;

a heart-shaped lock cam; and an energizing member for energizing the sliding member in an ejection direction, wherein the housing is constructed such that, while the card is disposed inside the card insertion port, overstroke of the card in the card insertion direction from a card mounting position is possible, wherein the connector terminals are retained in the form of cantilever beams, at least one of the connector terminals being provided with a first contact part and a second contact part which are formed by dividing a tip of the connector terminal into two branches, both of which are in contact with the corresponding contact terminal part, and which are disposed at different positions in the card insertion direction, and wherein when the card is inserted or ejected, as long as the card is further subjected to overstroke in the card insertion direction from the card mounting position, at least one of the first contact part and the second contact part is formed so as to always contact the corresponding contact terminal part;

wherein the first contact part is formed longer in the card insertion direction than the second contact part and placed on a side of the card insertion port;

wherein a relationship of L>A>S−B is satisfied where the distance between the first contact part and the second contact part is A; the distance between a contact position of the first contact part with the contact terminal part, and an edge of the contact terminal part at the card insertion port is B when the card is in a mounting position; the length of the contact terminal part in the card insertion direction is L; and an overstroke amount of the card is S;

wherein the sliding member moves in the card insertion direction together with the card; and wherein after the card over-strokes against an inserting and fitting position of the card, the sliding member is locked at the heart-shaped lock cam and the card is held at the mounting position.

2. The card connector according to claim 1, wherein the connector terminals having the first and second contact parts are ground or power connector terminals.

3. The card connector according to claim 2, wherein the first contact part and the second contact part are disposed at positions closer to the card insertion port than contact parts of the connector terminals for signal lines.

\* \* \* \* \*